United States Patent
Feroz et al.

(10) Patent No.: US 8,897,132 B2
(45) Date of Patent: Nov. 25, 2014

(54) ENHANCED RANDOM EARLY DISCARD FOR NETWORKED DEVICES

(75) Inventors: Azeem Feroz, San Jose, CA (US); Suresh Babu Muppala, Santa Clara, CA (US); Jon Eric Okholm, Monte Sereno, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 828 days.

(21) Appl. No.: 12/751,904

(22) Filed: Mar. 31, 2010

(65) Prior Publication Data

US 2011/0242979 A1    Oct. 6, 2011

(51) Int. Cl.
*H04L 12/26* (2006.01)
*H04L 12/835* (2013.01)
*H04L 12/823* (2013.01)
*H04L 12/801* (2013.01)
*H04L 12/859* (2013.01)

(52) U.S. Cl.
CPC ............ *H04L 47/17* (2013.01); *H04L 47/30* (2013.01); *H04L 47/326* (2013.01); *H04L 47/32* (2013.01); *H04L 47/2475* (2013.01); *H04L 43/026* (2013.01)
USPC ........................................................ 370/235

(58) Field of Classification Search
None
See application file for complete search history.

(56) References Cited

U.S. PATENT DOCUMENTS

| | | | |
|---|---|---|---|
| 7,525,912 B2 * | 4/2009 | Yazaki et al. | 370/230.1 |
| 2003/0223362 A1 * | 12/2003 | Mathews et al. | 370/230 |
| 2004/0090917 A1 * | 5/2004 | Ruutu et al. | 370/235 |
| 2007/0070907 A1 * | 3/2007 | Kumar et al. | 370/235 |
| 2007/0133419 A1 * | 6/2007 | Segel | 370/236 |
| 2009/0245130 A1 * | 10/2009 | Bing | 370/253 |
| 2009/0257441 A1 * | 10/2009 | Hata et al. | 370/412 |
| 2010/0027425 A1 * | 2/2010 | Cheung et al. | 370/238 |
| 2010/0091785 A1 * | 4/2010 | Monzawa | 370/412 |
| 2010/0220742 A1 * | 9/2010 | Brewer et al. | 370/412 |

* cited by examiner

*Primary Examiner* — Chirag Shah
*Assistant Examiner* — Amar Persaud
(74) *Attorney, Agent, or Firm* — Baker Botts L.L.P.

(57) ABSTRACT

Methods, apparatuses and systems directed to enhanced random early discard mechanisms implemented in various networked devices including end-systems such as servers and intermediate systems such as gateways and routers. In one implementation, the present invention enables a random early discard mechanism that intelligently biases the drop probabilities of select packets based on one or more application-aware and/or flow-aware metrics or state conditions.

24 Claims, 4 Drawing Sheets

ENHANCED RANDOM EARLY DISCARD FOR NETWORKED DEVICES

TECHNICAL FIELD

The present disclosure generally relates to computer networks and, more particularly, to methods, apparatuses and systems directed to packet discard mechanisms in networked devices.

BACKGROUND

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. In response, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. Bandwidth management devices allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, network security is another concern, such as the detection of computer viruses, as well as prevention of Denial-of-Service (DoS) attacks on, or unauthorized access to, enterprise networks. Accordingly, firewalls and other network devices are deployed at the edge of such networks to filter packets and perform various operations in response to a security threat. In addition, packet capture and other network data gathering devices are often deployed at the edge of, as well as at other strategic points in, a network to allow network administrators to monitor network conditions.

Enterprises network topologies can span a vast array of designs and connection schemes depending on the enterprise's resource requirements, the number of locations or offices to connect, desired service levels, costs and the like. A given enterprise often must support multiple LAN or WAN segments associated with headquarters, branch offices and other operational and office facilities. Indeed, enterprise network design topologies often include multiple, interconnected LAN and WAN segments in the enterprise's intranet, and multiple paths to extranets and the Internet. Enterprises that cannot afford the expense of private leased-lines to develop their own WANs, often employ frame relay, or other packet switched networks, together with Virtual Private Networking (VPN) technologies to connect private enterprise sites via a service provider's public network or the Internet. Some enterprises also use VPN technology to create extranets with customers, suppliers, and vendors. These network topologies often require the deployment of a variety of network devices at each remote facility. In addition, some network systems are end-to-end solutions, such as application traffic optimizers using compression tunnels, requiring network devices at each end of a communications path between, for example, a main office and a remote facility.

Network traffic load may be unpredictable at times and may exceed the processing capabilities of one or more network devices. Mechanisms directed to network loading conditions include Random Early Discard (RED), which is an active queue management algorithm. According to such Random Early Discard mechanisms, packets are chosen at random for discard to shed the load placed on a network device. RED monitors the average queue size and drops (or marks when used in conjunction with Explicit Congestion Notification) packets based on statistical probabilities. If the buffer is almost empty, all incoming packets are accepted. As the queue grows, the probability for dropping an incoming packet grows too. When the buffer is full, the probability has reached 1 and all incoming packets are dropped.

SUMMARY

The present invention provides methods, apparatuses and systems directed to enhanced random early discard mechanisms implemented in various networked devices including end-systems such as servers and intermediate systems such as gateways and routers. In one implementation, the present invention enables a random early discard mechanism that intelligently biases the drop probabilities of select packets based on one or more application-aware and/or flow-aware metrics or state conditions.

DESCRIPTION OF EXAMPLE EMBODIMENT(S)

A. General Network Device Software and Hardware Architecture

Figure 1:
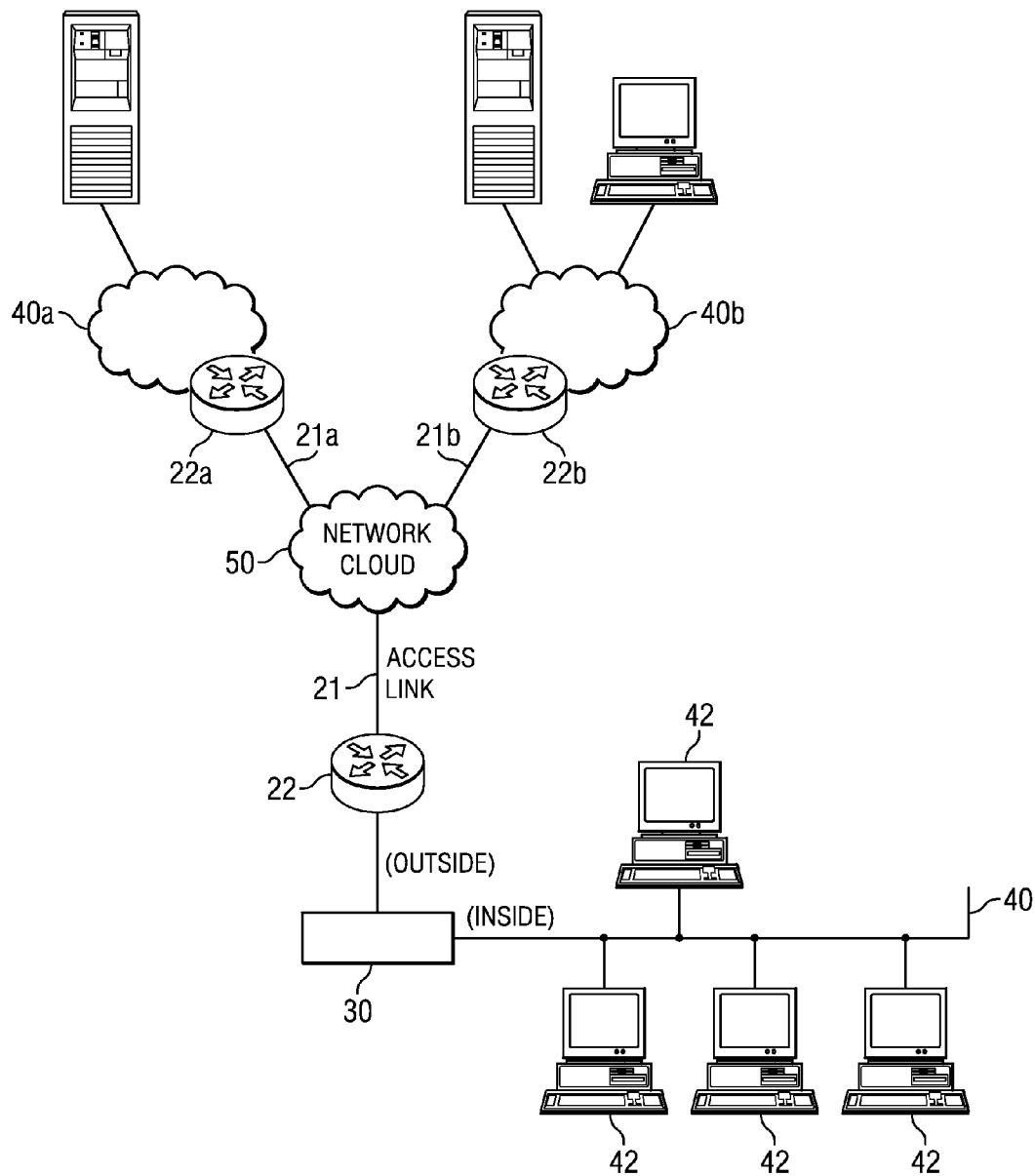
FIG. 1 is a schematic diagram illustrating an example computer network including a network device according to an implementation of the present invention.

FIG. 1 illustrates a network environment in which embodiments of the present invention may operate. As FIG. 1 shows, network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and computer network 50 is a packet-based communications environment, employing TCP/IP protocols, and/or other suitable protocols, and has a plurality of interconnected digital packet transmission stations or routing nodes. Network 40 can be a local area network, a wide area network, or any other suitable network. As FIG. 1 also illustrates, network device 30, in one implementation, is deployed at the edge of network 40. In one implementation, network device 30 is a network application traffic management device operative to manage data flows traversing access link 21. However, the enhanced random early discard functionality according to the present invention can be integrated into a variety of networked devices, such as proxies, firewalls, packet capture or network monitoring equipment, VPN servers, load balancers, web services network gateways or brokers, as well as end-systems, such as servers and the like. As FIG. 1 illustrates, network 50 interconnects networks 40, 40b which may be networks supporting branch office facilities, and network 40a, which may support a central operating or headquarters facility. Furthermore, although not shown in FIG. 1, additional network devices may be deployed at the edge of networks 40a, 40b, as well.

Figure 2:
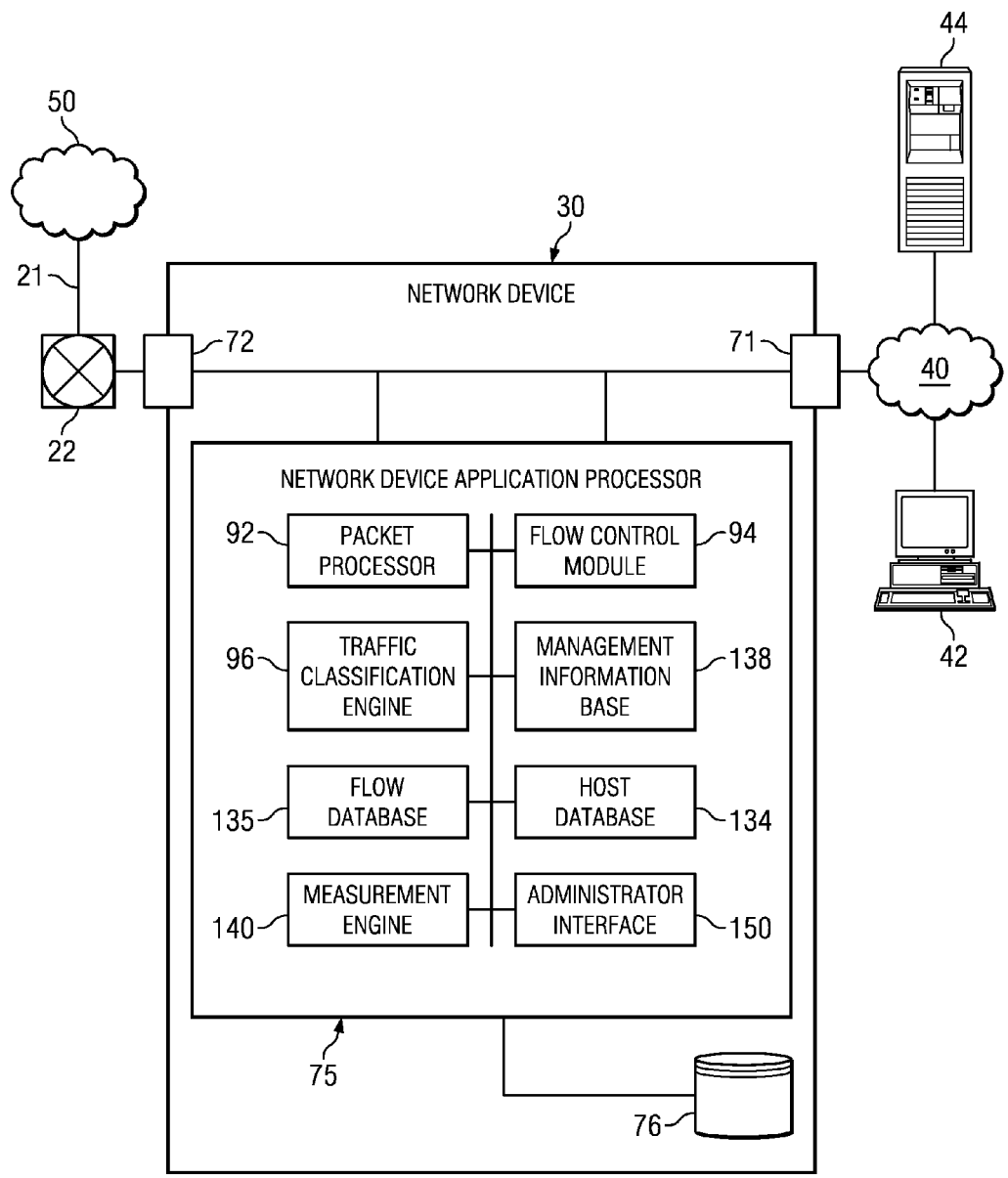
FIG. 2 is a functional block diagram illustrating the functionality of a network device configured according to an implementation of the present invention.

As FIG. 2 illustrates, network device 30, in one implementation, comprises network device application 75, and first and second network interfaces 71, 72, which operably connect network device 30 to the communications path between router 22 and network 40. Network device application 75 generally refers to the functionality implemented by network device 30, such as network monitoring or reporting, application traffic management, security, virtual-private networking, and the like. In one embodiment, network device application 75 is a combination of hardware and software, such as a central processing unit, memory, a system bus, an operating system, device drivers, and one or more software modules implementing the functions performed by network device, as well as the automated deployment and configuration functionality described herein.

In one embodiment, first and second network interfaces 71, 72 are the hardware communications interfaces that receive and transmit packets over the computer network environment. In one implementation first and second network interfaces 71, 72 reside on separate network interface cards operably connected to the system bus of network device 30. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. In one implementation, network device 30 includes a network interface driver, such as NIC driver 83 (see FIG. 3), that controls operation of network interfaces 71, 72. In other implementations, each network interface 71, 72 can be controlled by a separate driver. As FIG. 2 illustrates, network device 30, in one embodiment, includes persistent memory 76, such as a hard disk drive or other suitable memory device, such writable CD, DVD, or tape drives. Network device 30 can include additional network interfaces to support additional access links or other functionality.

Figure 3:
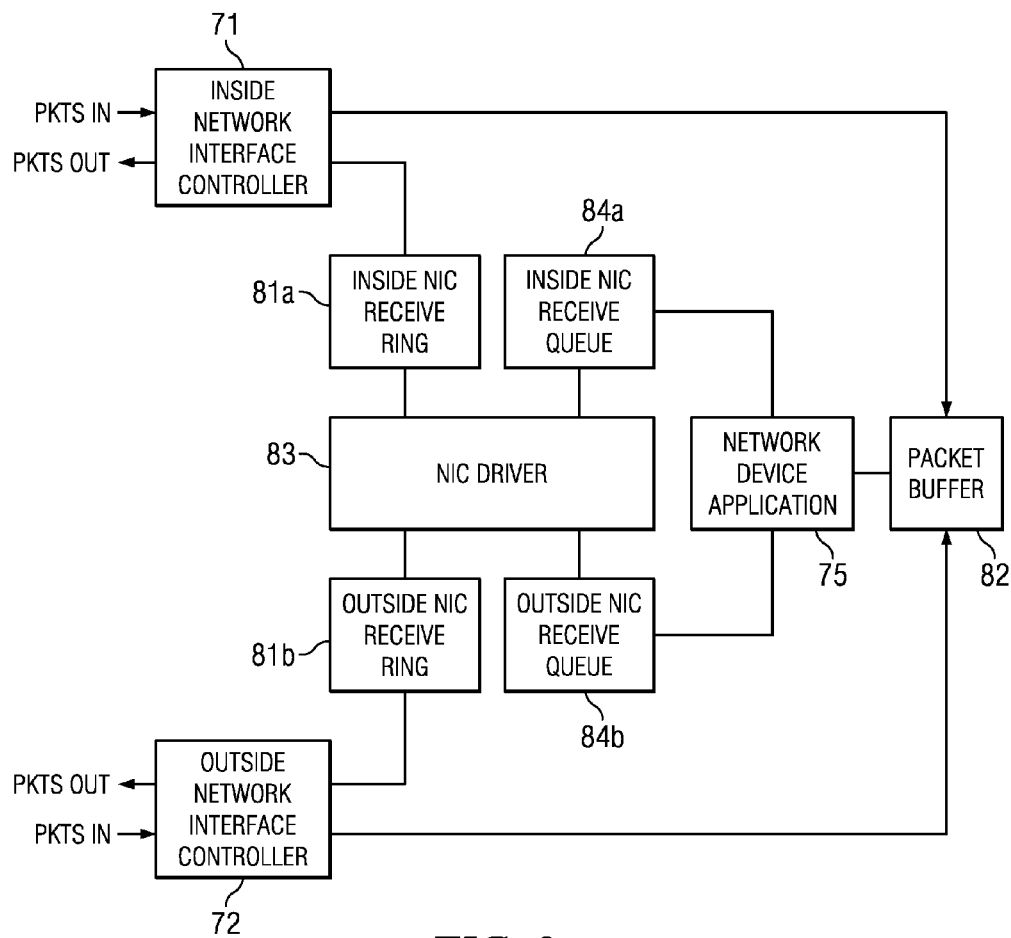
FIG. 3 is a functional block diagram illustrating an example interrelationship, according to one implementation of the present invention, among various hardware and software modules.

FIG. 3 provides a more detailed illustration of the functional modules, and data structures, relevant to describing implementations and example operations of the present invention. As FIG. 3 illustrates, network device 30 includes inside NIC receive ring 81a, outside NIC receive ring 81b, inside NIC receive queue 84a, outside NIC receive queue 84b, NIC driver 83, and packet buffer 82. Packet buffer 82 is operative to store packets received at network interfaces 71, 72. To summarize the operations associated with receiving and ultimately processing packets, network interface 71, for example, receives and stores a packet in packet buffer 82. Network interface 71 also maintains a pointer to the packet in inside NIC receive ring 81a. As discussed more fully below, NIC driver 83 determines whether to queue or otherwise retain the packet, or to discard it. In one implementation, NIC driver 83, operating at periodic interrupts, writes pointers out of inside NIC receive ring 81a and into inside NIC receive queue. Network device 30 operates substantially identically for packets received at outside network interface 72. Network device application 75, in one implementation, operates on packets stored in packet buffer 82 by accessing the memory address spaces (pointers) to the packets in inside NIC receive queue 84a and outside NIC receive queue 84b. As FIG. 3 illustrates, in one implementation, a packet received at inside network interface 71 is generally transmitted, after processing by network device application, from outside network interface 72. The rings and other data structures supporting the transmission of packets from network interfaces 71, 72 are not shown.

In one implementation, packet buffer 82 comprises a series of fixed-size memory spaces for each packet (e.g., 50,000 spaces). In other implementations, packet buffer 82 includes mechanisms allowing for variable sized memory spaces depending on the size of the packet. Inside NIC receive ring 81a is a circular queue or ring of memory addresses (pointers) corresponding to packets stored in packet buffer 82. In one implementation, inside NIC receive ring 81a includes 256 entries; however, the number of entries is a matter of engineering and design choice. In one implementation, each entry of inside NIC receive ring 81a includes a field for a memory address, as well as other fields for status flags, random early discard values, and the like. For example, one status flag indicates whether the memory address space is empty or filled with a packet. Inside NIC receive ring 81a also maintains head and tail memory addresses, as described below. In one implementation, network interface 71 also maintains the head and tail memory address spaces in its registers. The head memory address space corresponds to the next available memory space in packet buffer 82 to which the next packet is to be stored. Accordingly, when network interface 71 receives a packet, it checks the head address register to determine where in the system memory reserved for packet buffer 82 to store the packet. After the packet is stored, the status flag in the ring entry is changed to filled. In addition, the system memory returns a memory address for storing the next received packet, which is stored in the next entry in inside NIC receive ring 81a, in addition, the head address register is advanced to this next memory address. The tail memory address space corresponds to the earliest received packet which has not been processed by NIC driver 83. In one implementation, network interface 71 also maintains a copy of inside NIC receive ring 81a in a memory unit residing on the network interface hardware itself. In one implementation, network interface 71 discards packets when inside NIC receive ring 81a is full—i.e., when the tail and head memory addresses are the same.

As discussed above, NIC driver 83 is operative to read packet pointers from inside NIC receive ring 81a to inside NIC receive queue 84a. In one implementation, NIC driver 83 operates on inside NIC receive ring 81a by accessing the tail memory address to identify the earliest received packet. To write the packet in the inside NIC receive queue 84a, NIC driver 83 copies the memory address into inside NIC receive queue 84a, sets the status flag in the entry in inside NIC receive ring 81a corresponding to the tail memory address to empty, and advances the tail memory address to the next entry in the ring. NIC driver 83 can discard a packet by simply dropping it from inside NIC receive ring 81a (as discussed above), and not writing it into inside NIC receive queue 84a. As discussed more fully below, this discard operation may be performed in connection with random early drop mechanisms that are enhanced with various application-aware and flow-aware rule sets. Still further, NIC driver 83, in one implementation, is a software module that operates at periodic interrupts to process packets from inside NIC receive ring 81a to inside NIC receive queue 84a. At each interrupt, NIC driver 83 can process all or a given number of packets in receive ring 81a. Furthermore, in some implementations, a fairness algorithm controls which of inside NIC receive ring 81a and outside NIC receive ring 81b to process first at each interrupt.

Inside NIC receive queue 84a, in one implementation, is a queue or other data structure of memory address spaces corresponding to packets stored in packet buffer 82. In one embodiment, inside NIC receive queue 84a is implemented as a linked list, where each entry in the list includes a pointer to the previous entry, a pointer to the packet in buffer 82, a pointer to the next entry. Of course, each entry in the list may include additional fields, such as flags and other data fields. In addition, inside NIC receive queue 84a can be implemented in other ways beyond linked lists. As discussed above, network device application 75, operating at a higher level, processes packets in packet buffer 82 popping packet pointers from receive queues 84a, 84b.

In one implementation, inside NIC receive ring 81a, outside NIC receive ring 81b, inside NIC receive queue 84a, outside NIC receive queue 84b, and packet buffer 82 are maintained in reserved spaces of the system memory of network device 30. The system memory implemented in network device 30, in one embodiment, includes one or more DRAM chips and a memory controller providing the interface, and handling the input-output operations, associated with storing data in the DRAM chip(s). In one implementation, the hardware in network device 30 includes functionality allowing first and second network interfaces 71, 72 to directly access memory 82 to store inbound packets received at the interfaces in packet buffer. For example, in one implementation, the system chip set associated with network device 30 can include a Direct Memory Access (DMA) controller, which is a circuit that allows for transfer of a block of data from the buffer memory of a network interface, for example, directly to memory 82 without CPU involvement. A variety of direct memory access technologies and protocols can be used, such as standard DMA, first-party DMA (bus mastering), and programmed I/O (PIO). In one implementation, each network interface 71 and 72 is allocated a DMA channel to the memory 82 to store packets received at the corresponding interfaces.

In addition, the system chip set of network device 30, in one implementation, further includes an interrupt controller to receive and prioritize interrupt requests (IRQs) transmitted by devices over the system bus. Network device 30, in one implementation, further includes an interrupt timer that periodically transmits an interrupt signal to the interrupt controller. In one implementation, the interrupt controller, after receiving the periodic interrupt signal, dedicates the CPU and other resources to NIC driver 83 to process received packets as discussed above. In one implementation, the interrupt timer transmits interrupt signals every 50 microseconds; of course, this interval is a matter of engineering or system design choice. In certain implementations of the present invention, network interfaces 71, 72 can transmit demand-based interrupts after packets have arrived.

B. Network Device Application

Network device application 75 generally refers to the functionality implemented by network device 30, such as load balancing, network monitoring or reporting, application traffic management, security, virtual-private networking, network applications, and the like. For didactic purposes, network device 30 is an application traffic management appliance configured to manage network traffic traversing access link 21. One skilled in the art, however, will recognize that the load shedding functionality described herein may be integrated into a variety of networked devices deployed in network environments, such as proxies, firewalls, packet capture or network monitoring equipment, VPN servers, a web services network gateways or brokers, servers, and other computing devices.

As FIG. 2 illustrates, network device application 75, in one implementation, includes a packet processor 92, flow control module 94, and traffic classification engine 96. Network device application 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more measurement variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of network device 30, as well as manually created traffic classes configured by a network administrator, in a hierarchical traffic class structure. In one embodiment, traffic classification engine 96 stores traffic classes, in association with pointers to traffic management policies or pointers to data structures defining such traffic management policies. In one implementation, flow control module 94 is operative to apply bandwidth utilization controls to data flows traversing the access link 21 in the inbound and/or outbound directions.

As discussed above, in one implementation, network device application 75 further comprises measurement engine 140, management information base (MIB) 138, and administrator interface 150. Management information base 138 is a database of standard and extended network objects related to the operation of network device 30. Measurement engine 140 maintains measurement data relating to operation of network device 30 to allow for monitoring of bandwidth utilization and network performance across access link 21 with respect to a plurality of bandwidth utilization and other network statistics on an aggregate and/or per-traffic-class level.

Administrator interface 150 facilitates the configuration of network device 30 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 can provide a command line interface or a graphical user interface accessible, for example, through a conventional browser on client device 42.

B.1. Packet Processing

As discussed above, packet processor 92, in one implementation, is operative to detect new data flows, instantiate data structures associated with the flows and parse packets to populate one or more fields in the data structures. In one embodiment, when packet processor 92 encounters a new data flow it stores the source and destination IP addresses contained in the packet headers in host database 134. Packet processor 92 further constructs a control block (flow) object including attributes characterizing a specific flow between two end systems. In one embodiment, packet processor 92 writes data flow attributes having variably-sized strings (e.g., URLs, host names, etc.) to a dynamic memory pool. The flow specification object attributes contain attribute identifiers having fixed sizes (e.g., IP addresses, port numbers, service IDs, protocol IDs, etc.), as well as the pointers to the corresponding attributes stored in the dynamic memory pool. Other flow attributes may include application specific attributes gleaned from layers above the TCP layer, such as codec identifiers for Voice over IP calls, Citrix database identifiers, and the like. Packet processor 92, in one embodiment, reserves memory space in the dynamic memory pool for storing such variably-sized attribute information as flows traverse network device 30. Packet processor 92 also stores meta information relating to the received packets in packet buffer 82. In one embodiment, the packets are stored in packet buffer 82 with a wrapper including various information fields, such as the time the packet was received, the packet flow direction (inbound or outbound), and a pointer to the control block object corresponding to the flow of which the packet is a part. One or more functional aspects of packet processor 92 can be implemented by a network processing unit or other specialized hardware or logic circuits in addition to or in lieu of software-based implementations.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. No. 6,046,980 and U.S. Pat. No. 6,591,299, as well as others incorporated by reference herein, disclose classification of data flows for use in a packet-based communications environment. FIG. 1 illustrates the concept associated with inside and outside addresses. As discussed above, in one embodiment, a flow specification object includes an "inside" and "outside" address relative to network device 30. See FIG. 1. For a TCP/IP packet, packet processor 92 can compute the inside and outside addresses based on the source and destination network addresses of the packet and the direction of the packet flow.

In one embodiment, packet processor 92 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, speed information, apparent round trip time, packet count, number of packet drops, TCP congestion window size, etc. Control block object attributes further include at least one traffic class identifier (or pointer(s) thereto) associated with the data flow, as well as policy parameters (or pointers thereto) corresponding to the identified traffic class. In one embodiment, control block objects further include a list of traffic classes for which measurement data (maintained by measurement engine 140) associated with the data flow should be logged. In one embodiment, to facilitate association of an existing control block object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding control block object. According to this embodiment, to identify whether a control block object exists for a given data flow, packet processor 92 hashes the values identified above and scans the hash table for a matching entry. If one exists, packet processor 92 associates the pointer to the corresponding control block object with the packets in the data flow.

To allow for identification of service types (e.g., FTP, HTTP, etc.), packet processor 92, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When network device 30 encounters a new flow, packet processor 92 analyzes the data flow against the service attributes in the services table to identify a service ID corresponding to the flow. In one embodiment, packet processor 92 may identify more than one service ID associated with the flow. In this instance, packet processor 92 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, packet processor 92 associates the flow with the most specific service ID. A traffic class maintained by traffic classification engine 96 may be configured to include matching rules based on the service IDs in the services table. For example, a matching rule directed to HTTP traffic may simply refer to the corresponding service ID, as opposed to the individual attributes that packet processor 92 uses to initially identify the service.

Packet processor 92, in one implementation, maintains certain data in host database 134 that characterizes various host-related behaviors. In one implementation, host database 134 maintains for each host address the following fields: 1) the number of new flows or connections for which the host is a client over the last minute [clientNewFPM]; 2) the number of current or existing TCP (or other handshake-oriented protocol) connections for which the host is a client [currentClientTCBs]; 3) the number of current UDP (or other similar protocol) connections for which the host is a client [currentClientUCBs]; 4) the number of new flows or connections for which the host is a server over the last minute [serverNewFPM]; 5) the number of current or existing TCP (or other handshake-oriented protocol) connections for which the host is a server [currentServerTCBs]; and 6) the number of current UDP (or other similar protocol) connections for which the host is a server [currentServerUCBs]. As discussed above, packet processor 92 is operative to identify new data flows, as well as the termination of existing data flows, and updates the statistics identified above as data flows traverse network device. As discussed below, NIC driver 83, in one implementation, is operative to access these values, as well as other data structures (e.g., flow database 135) to determine whether to bias random early discard operations in favor of discarding various received packets.

B.2. Traffic Classification

A traffic class comprises a set of matching rules or attributes allowing for logical grouping of data flows that share the same characteristic or set of characteristics—e.g., a service ID or type (see Section A.1., above), a specific application, protocol, IP address, MAC address, port, subnet, etc. In one embodiment, each traffic class has at least one attribute defining the criterion(ia) used for identifying a specific traffic class. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, network device 30 includes functionality allowing for classification of network traffic based on information from layers 2 to 7 of the OSI reference model. Network device 30 can be configured to include matching rules that define a plurality of network applications commonly found in enterprise networks, such as database applications, Citrix® flows, ERP applications, and the like.

In one embodiment, network device 30 is configured to include a predefined set of traffic classes based upon a knowledge base gleaned from observation of common or known traffic types on current networks. Network device 30, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, network device 30 may also include traffic class discovery functionality that automatically adds traffic classes to traffic classification engine 96 in response to data flows traversing the device. Automatic traffic discovery and classification is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet.

In one embodiment, the root traffic classifications are "/Inbound" and "/Outbound" data flows. Any data flow not explicitly classified is classified as "/Inbound/Default" or "/Outbound/Default". The "LocalHost" traffic class corresponds to data flows destined for network device 30, such as requests for stored measurement data or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented.

For example, traffic classification engine 96 may be configured to traverse all traffic class nodes at a given level before proceeding to lower levels of the traffic classification tree. If more than one traffic class matches the data flow, traffic classification engine 96 can be configured with rules or other logic to select from one of the matching traffic classes.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Network device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236,149, incorporated by reference herein, discloses the use and implementation of embeddable reference trees.

B.3. Flow Control Module

As discussed above, flow control module 94 applies bandwidth utilization controls (and, in some embodiments, other policies) to data flows traversing access link 21. The above-identified patents and patent applications describe the operations of, and bandwidth utilization controls, implemented or supported by flow control module 94. Network device 30, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into embodiments of the present invention. The functionality of flow control module 94, in one implementation, can be conceptually segregated into three main tasks: 1) allocation of bandwidth to individual flows, 2) enforcement of bandwidth allocations, and 3) monitoring of actual bandwidth utilization to provide feedback to subsequent bandwidth allocations.

Allocation of bandwidth is primarily influenced by three main factors: 1) the number of concurrent flows and their respective traffic classifications; 2) the overall or aggregate bandwidth utilization control scheme configured by the network administrator (such as the capacity of the access link, the partitions that have been configured, configured rate policies, and the like), and 3) the respective target rates corresponding to the individual flows. U.S. application Ser. No. 10/810,785 and U.S. Pat. Nos. 5,802,106 and 6,205,120, incorporated by reference above, disclose methods for determining target rates for data flows for use in bandwidth allocation decisions. As discussed above, a user can select a given traffic class and specify one or more bandwidth utilization controls for the traffic class. A bandwidth utilization control for a particular traffic class can comprise an aggregate bandwidth utilization control, a per-flow bandwidth utilization control, or a combination of the two. The combination of bandwidth utilization controls across the traffic classes defines an aggregate bandwidth utilization control scheme.

Flow control module 132 can use any suitable functionality to enforce bandwidth allocations known in the art, including, but not limited to class-based queuing, weighted fair queuing, class-based weighted fair queuing, Committed Access Rate (CAR) and "leaky bucket" techniques. Flow control module 132, in one implementation, may incorporate any or a subset of the TCP rate control functionality described in the cross-referenced U.S. patents and/or patent applications set forth above for controlling the rate of data flows.

C. Enhanced Random Early Discard

Random Early Discard mechanisms, in one implementation, operate when an observed load (such as the depth of a processing queue—for example, receive queue 84a or 84b) exceeds a threshold (e.g., 70 percent utilization). Some RED mechanisms assign random values (referred to in this disclosure as a "Random Early Discard (RED) value") within a value range (e.g., 0.00 to 1.00, 0 to 99, etc.) to the incoming packets. When RED is initiated, the RED value of a packet is compared to a drop probability value. If the RED value (e.g., 0.2) is less than the drop probability value (e.g., 0.25), the RED mechanism discards the packet. The drop probability rises as the observed load increases, thereby raising the chances that packets are dropped. At some maximum threshold, the drop probability may be set to cause all received packets to be dropped.

As discussed below, implementations of the present invention bias the operation of RED based on application-aware and/or flow-state-aware rule sets to improve overall system and network wide resource utilization and thereby improve end user experience.

C.1. Selective RED Biasing

In one implementation, network device 30 is operative to selectively bias operation of RED as to received packets based on various application-aware and/or flow-aware considerations. For example, as discussed more fully below, NIC driver 83 is operative to apply a rule set to dynamically determine a drop probability for a given packet or set of packets.

Figure 4A:
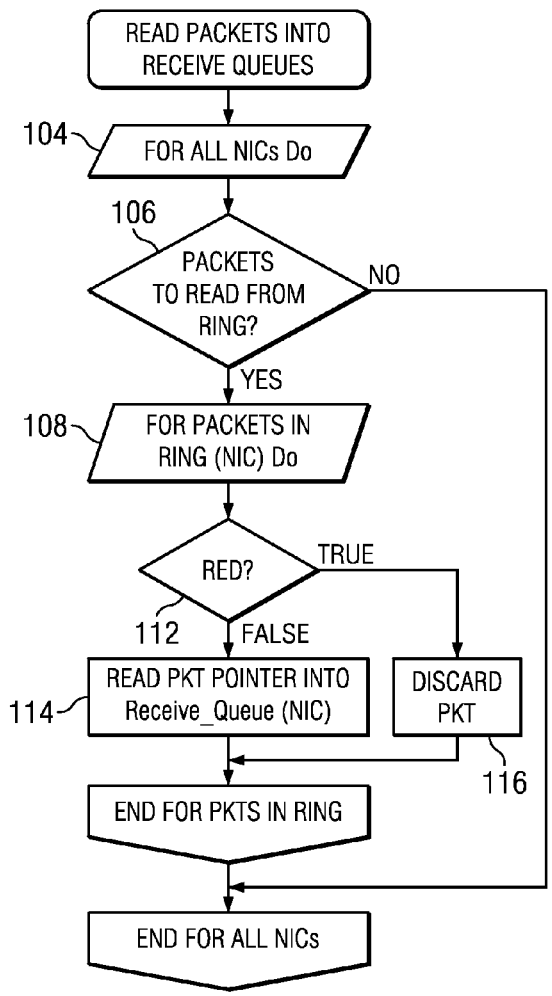
FIG. 4A is a flow chart diagram illustrating an example method, according to an embodiment of the present invention, directed to reading packets onto a processing queue.

After each interrupt, NIC driver 83 reads pointers to packets from inside and outside NIC receive rings 81a, 81b into inside and outside receive queues 84a, 84b. As discussed above, inside and outside network interfaces 71, 72 continuously receive packets, storing pointers to packets in the receive rings 81a, 81b. FIG. 4A illustrates a method, according to one implementation of the present invention, directed to reading packets onto a processing queue or discarding the packets. In one implementation, assuming the corresponding receive ring 81a or 81b includes packet pointers during the current interrupt interval (106), NIC driver 83, for all network interfaces (here, inside and outside interfaces 71, 72) (104), applies an enhanced random early drop (RED) mechanism (112) to each packet. As FIG. 4A illustrates, if operation of the RED mechanism indicates that a packet should be dropped, NIC driver 83 discards the packet (116). Otherwise, NIC driver 83 reads the packet pointer on to the corresponding receive queue 84a or 84b (114). In one implementation, NIC driver 83 can process all packets stored in the receive ring 81a, 81b at the start of the interrupt interval (108). In other implementations, the number of packets read from the receive rings 81a, 81b during a given interrupt interval can be limited to a configurable number.

Figure 4B:
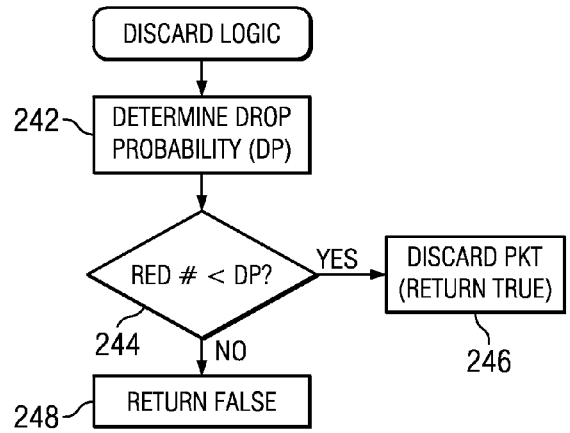
FIG. 4B is a flow chart diagram providing an example method, according to another embodiment of the present invention, directed to implementing a random early discard mechanism.

FIG. 4B illustrates the decisional logic in a biased RED function, according to one implementation of the present invention, associated with determining whether to discard a packet. In one implementation, the biased RED function returns a Boolean value indicating whether the packet should be discarded. As discussed above, the RED operations described herein begin when the load of the inside or outside NIC receive queues 84a, 84b exceeds a threshold parameter. In one implementation, RED values are generated for received packets. As FIG. 4B illustrates, in connection with reading a given packet from the receive rings 81a or 81b, the biased RED function determines a drop probability for the packet (242). If the RED value of the packet is less than the determined drop probability (244), the packet is discarded (246). Otherwise, the packet is read onto the receive queue 84a or 84b (248).

The drop probability for a packet can be determined in a variety of manners. For example, a drop probability may be computed based on the following equation:

Drop_Probability_Pkt=Baseline_Drop_Probability(load)+ FactorAdjust(Pkt).

In the foregoing example, the baseline drop probability is a uniform drop probability that is applied across all flows that varies with observed load. As discussed above, increases in observed load result in increases to the baseline drop probability. In other implementations, the baseline drop probability can also vary across network traffic classifications and other factors, in addition to load. For example, different network applications or packet types can have different baseline drop probabilities.

FactorAdjust(Pkt) is a function that returns an adjustment value used to adjust the baseline drop probability, as discussed below. In one implementation, the value Drop_Probability_Pkt can be set to 0 if FactorAdjust(Pkt) is negative and its absolute value is greater than Baseline_Drop_Probability (load). In addition, Drop_Probability_Pkt can be set to 1 or 100 (depending on the range) if Baseline_Drop_Probability (load)+FactorAdjust(Pkt) is greater than the maximum drop probability value. Other implementations are also possible. For example, the FactorAdjust(Pkt) value can be used as a multiplier or divisor of Baseline_Drop_Probability in the FactorAdjust function.

In one implementation, the FactorAdjust function can apply one or more rule sets to determine an adjustment value. As discussed above, the resulting adjustment value can be negative or positive. In addition, the rule set that can be applied by the FactorAdjust function can include a plurality of rules that can be applied on an exclusive (e.g., best match basis or first match in an ordered rule set) or concurrently (all matches are applied). The FactorAdjust function can utilize application classification or category information of a data flow corresponding to a packet to alter the discard probability of a packet. If, for example, the application/service-type for the data flow is already known, the FactorAdjust function can utilize the application/service information stored in flow database 135 to assess the impact of discarding the packet on end-user experience (e.g., discarding TFTP packets may be desirable compared to real-time voice/video packets). In one implementation, if a packet's data flow has been classified as VoIP, for example, this factor can cause the FactorAdjust function to decrement 5 or 10 percent of the drop probability. In one implementation, a data flow classification into TFTP or some other set of network applications may cause an increment of 5 or 10 percent of the drop probability.

Other rules can be based on an assessment of the impact of discarding the packet on possible future network resource consumption. For example, the FactorAdjust function can inspect the contents of the packet to determine whether it is a HTTP GET request or some other response-initiating packet and also assess the network application type. For example, the rule sets may be configured to bias the probability of dropping packets including search queries in favor of discard to prevent or delay the return of a search response, which may span multiple packets and spawn multiple TCP connections. In addition, some rule sets may be configured to bias peer-to-peer packet traffic in favor of discard (e.g., by setting the drop probability to 100 percent). In some implementations, the rule sets can be configured with overriding values that specify drop probabilities for packets that correspond to certain network applications or services, such as P2P file sharing applications and the like. In other implementations, certain message types in a data flow classified into a given network application can include a RED discard affinity value or incremental adjustment value.

In some implementations, the FactorAdjust function can utilize cached information in order to determine a preliminary classification of a data flow or applicable policy upon encountering the first packet of such data flow. In particular implementations, network device 30 can implement a flow-triggered policy caching mechanism that allows for previous classification policy decisions made for previous data flows to be applied to subsequent new flows. When network device 30 receives a packet, packet parsing logic parses the received packet and computes a hash of an attribute tuple of the received packet. In one implementation, the tuple comprises the source IP address, destination IP address, source port number, destination port number, and a protocol identifier (such as TCP, UDP, etc.). Network device 30 uses this 5-tuple to identify different data flows between hosts. In one implementation, the values of these fields are arranged in an order, depending on the direction the packet is traveling, to ensure that the resulting hash is the same for data flows of the packet transmitted in either direction. In one implementation, the hardware-computed hash is a 16-bit hash. A secondary longer (e.g., 32-bit) hash, or a hash using a different algorithm, of the same 5-tuple is also computed to identify the data flow. In one implementation, the 16-bit hash may map to one or more secondary hashes. To identify a data flow, the 16-bit hash essentially narrows the search space to a subset of the secondary hashes that are mapped to the 16-bit hash. A cache entry may comprise a key value, a time stamp, and flow attribute and configuration information (such as service identifiers, policies and the like). The key comprises a tuple of an IP addresses, port numbers and a protocol identifier. In some implementations, when a traffic class is identified for a data flow and/or a policy is selected, these classification and policy decisions are stored in a cache in association with the flow key. The FactorAdjust function may use this cached flow information for new data flows, where the tuple of attributes of the new packets match the cached information. In some implementations, the key may comprise a subset of the 5-tuple described above, such as the IP address and port number of the host identified as the server in the connection. The FactorAdjust function can use the cached information to identify a potential traffic classification, which can then be used in determining a drop probability for the data flow. The FactorAdjust function may also cache its previous adjustment values in connection with the flow-tuple to facilitate faster processing of the queues. In yet other implementations, the FactorAdjust function or NIC driver 83 may also cache the decision to discard the packet of a data flow. The FactorAdjust function can use this cached information, for example, to decide whether to bias the operation of RED for the instant packet based on the recorded instances of prior packet discards. For example, the In some implementations, the FactorAdjust function may also access TCP (or other transport layer) flow congestion control metrics (such as window size, round trip time, etc.) to assess whether discarding a given packet would have an undesirable impact on TCP congestion control. For example, for a given flow dropping three or more packets in the same TCP window can result in a timeout and multiple SSTHRESH reductions thereby adversely affecting throughput. To address this, the drop probability for a packet can be modified to avoid multiple packet drops per window for a given flow providing a more optimal usage of bandwidth resources. In addition, drop probabilities can be modified to bias against dropping packets where TCP window sizes are below a threshold window size value.

The FactorAdjust function may also access host database 134 to compare certain observed parameters corresponding to the source and/or destination host(s) identified in the packet, and compares them against corresponding threshold values to determine whether to bias operation of RED. For example, the if the number of new data flows for which the source host identified in the packet is a client (clientNewFPM) currently exceeds a threshold value, and either the number of current TCP connections (currentTCBs) exceeds another threshold, or the number of current UDP or similar connections (currentUCBs) exceeds yet another threshold, the FactorAdjust function can increase the drop probability, rendering it much more likely that the packet will be dropped.

Other implementations are also possible. For example, the RED functionality discussed above can also be configured to modify the RED discard values associated with the packets themselves in lieu of, or in addition to, modifying the drop probabilities of the packets. In such an implementation, for example, the drop probability can remain uniform, while the FactorAdjust function can be adapted to increase or decrease the RED value associated with the packet.

Lastly, although the present invention has been described as operating in connection with end systems and networks primarily employing the HTTP, TCP and IP protocols, the present invention has application in computer network environments employing any suitable network protocol suite. In addition, while in the embodiments described above the operations associated with the present invention are distributed across various modules, a variety of other implementations featuring different distributions of the operations are possible. In addition, a separate NIC driver can be configured for each physical network interface. Still further, while certain of the implementations described above include two interfaces, the present invention can be applied to network devices having one to a plurality of network interfaces. In addition, while the embodiments described above operate on a queue functionally disposed between a network interface and a software processing queue, implementations of the invention have application to the use of RED mechanisms that operate on queues generally, such as queues functionally disposed between two software modules. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method, comprising:
   monitoring the number of received packets stored in a buffer relative to a threshold value; and
   if the number of received packets stored in the buffer exceeds the threshold value, then initiating a random early discard mechanism to randomly discard one or more of the received packets; and
   biasing operation of the random early discard mechanism to alter drop probabilities corresponding to individual packets based on one or more attributes associated with the respective individual packets, wherein biasing operation of the random early discard mechanism for a given packet comprises:
   maintaining a maximum drop probability value; and
   based on one or more attributes associated with the given packet, identifying cached information associated with previous policy decisions made for previous packet flows;
   calculating an adjusted drop probability value for the given packet based on the cached information associated with the previous policy decisions made for the previous packet flows; and
   in response to determining that the adjusted drop probability is less than the maximum drop probability value, determining whether to discard the given packet based at least in part on the one or more attributes associated with the given packet.

2. The method of claim 1 wherein calculating the drop probability value for the given packet based on one or more attributes associated with the given packet comprises
   maintaining a baseline drop probability value that varies with observed load;
   computing an adjustment factor for the given packet; and
   determining the drop probability value for the given packet by using the adjustment factor to modify the baseline drop probability value.

3. The method of claim 2 wherein the computing an adjustment factor comprises applying one or more rules that consider one or more flow state parameters of a data flow corresponding to the given packet.

4. The method of claim 2 wherein the computing an adjustment factor comprises applying one or more rules that consider an application type of a data flow corresponding to the given packet.

5. The method of claim 2 wherein the computing an adjustment factor comprises applying one or more rules that consider a message type of a plurality of message types corresponding to the given packet, wherein each of the message types corresponds to a transaction state of a plurality of transaction states.

6. The method of claim 5 wherein a first message type is a request message, and wherein a second message type of the plurality of message types is a response.

7. The method of claim 2 wherein the computing an adjustment factor comprises applying one or more rules that consider previous drop decisions for previous packets of a data flow corresponding to the given packet.

8. The method of claim 1 further comprising:
   assigning a random value to the given packet;
   comparing the random value to the drop probability value that is based on one or more attributes associated with the given packet; and
   discarding the given packet in response to determining that the random value is less than the drop probability value.

9. An apparatus, comprising:
   a system bus,
   a processor connected to the system bus;
   a system memory, connected to the system bus, wherein the system memory maintains a plurality of data structures, the plurality of data structures comprising
   a packet buffer for storing packets;
   at least one network interface receive ring for storing pointers to packets in the packet buffer; and at least one receive queue for storing pointers to packets in the packet buffer;

at least one network interface, connected to the system bus, operative to receive packets transmitted over a computer network;
read received packets into the packet buffer, and
maintain pointers to the received packets in a corresponding one of the network interface receive rings;

a random early discard mechanism operative to randomly discard packets in the packet buffer when an observed load crosses a threshold value; and a biasing function operative to bias operation of the random early discard mechanism to alter drop probabilities corresponding to individual packets based on one or more attributes associated with the respective individual packets, wherein the biasing function is further operative:

maintain a maximum drop probability value;

based on one or more attributes associated with the given packet, identify cached information associated with previous policy decisions made for previous packet flows;

calculate an adjusted drop probability value for the given packet based on the cached information associated with the previous policy decisions made for the previous packet flows; and in response to determining that the adjusted drop probability is less than the maximum drop probability value, determine whether to discard the given packet based at least in part on the one or more attributes associated with the given packet.

10. The apparatus of claim 9 wherein to calculate the drop probability value for the given packet based on one or more attributes associated with the given packet the biasing function is operative to maintain a baseline drop probability value that varies with observed load;

compute an adjustment factor for the given packet; and determine the drop probability value for the given packet by using the adjustment factor to modify the baseline drop probability value.

11. The apparatus of claim 10 wherein to compute an adjustment factor the biasing function is operative to apply one or more rules that consider one or more flow state parameters of a data flow corresponding to the given packet.

12. The apparatus of claim 10 wherein to compute an adjustment factor the biasing function is operative to apply one or more rules that consider an application type of a data flow corresponding to the given packet.

13. The apparatus of claim 10 wherein to compute an adjustment factor the biasing function is operative to apply one or more rules that consider a message type of a plurality of message types corresponding to the given packet, wherein each of the message types corresponds to a transaction state of a plurality of transaction states.

14. The apparatus of claim 13 wherein a first message type is a request message, and wherein a second message type of the plurality of message types is a response.

15. The apparatus of claim 10 wherein to compute an adjustment factor the biasing function is operative to apply one or more rules that consider previous drop decisions for previous packets of a data flow corresponding to the given packet.

16. The apparatus of claim 9 wherein the biasing function is further operative to:

assigning a random value to the given packet;

comparing the random value to the drop probability value that is based on one or more attributes associated with the given packet; and discarding the given packet in response to determining that the random value is less than the drop probability value.

17. An apparatus, comprising:

a processor; and a memory, wherein the memory maintains a plurality of data structures, the plurality of data structures comprising a packet buffer for storing packets;

a first queue for storing pointers to packets in the packet buffer; and a second queue for storing pointers to packets in the packet buffer;

a processing module operative to read pointers from the first queue to the second queue for further processing;

a random early discard mechanism operative to randomly discard packets in the packet buffer when an observed load crosses a threshold value; and a biasing function operative to bias operation of the random early discard mechanism to alter drop probabilities corresponding to individual packets based on one or more attributes associated with the respective individual packets, wherein the biasing function is further operative to:

maintain a maximum drop probability value;

based on one or more attributes associated with the given packet, identify cached information associated with previous policy decisions made for previous packet flows;

calculate an adjusted drop probability value for the given packet based on the cached information associated with the previous policy decisions made for the previous packet flows; and in response to determining that the adjusted drop probability is less than the maximum drop probability value, determine whether to discard the given packet based at least in part on the one or more attributes associated with the given packet.

18. The apparatus of claim 17 wherein to calculate the drop probability value for the given packet based on one or more attributes associated with the given packet the biasing function is operative to maintain a baseline drop probability value that varies with observed load;

compute an adjustment factor for the given packet; and determine the drop probability value for the given packet by using the adjustment factor to modify the baseline drop probability value.

19. The apparatus of claim 18 wherein to compute an adjustment factor the biasing function is operative to apply one or more rules that consider one or more flow state parameters of a data flow corresponding to the given packet.

20. The apparatus of claim 17 wherein to compute an adjustment factor the biasing function is operative to apply one or more rules that consider an application type of a data flow corresponding to the given packet.

21. The apparatus of claim 17 wherein to compute an adjustment factor the biasing function is operative to apply one or more rules that consider a message type of a plurality of message types corresponding to the given packet, wherein each of the message types corresponds to a transaction state of a plurality of transaction states.

22. The apparatus of claim 21 wherein a first message type is a request message, and wherein a second message type of the plurality of message types is a response.

23. The apparatus of claim 17 wherein to compute an adjustment factor the biasing function is operative to apply one or more rules that consider previous drop decisions for previous packets of a data flow corresponding to the given packet.

24. The apparatus of claim 17 wherein the biasing function is further operative to:
   assigning a random value to the given packet;
   comparing the random value to the drop probability value that is based on one or more attributes associated with the given packet; and
   discarding the given packet in response to determining that the random value is less than the drop probability value.

\* \* \* \* \*